Patented Nov. 21, 1939

2,180,337

UNITED STATES PATENT OFFICE 2,180,337

DYESTUFFS OF THE ANTHRAQUINONE SERIES

Edwin C. Buxbaum, Silverside Heights, Del., assignor to E. I. du Pont de Nemours & Company, Wilmington, Del., a corporation of Delaware No Drawing. Application August 10, 1938, Serial No. 224,123

5 Claims. (Cl. 260—371)

This invention relates to the preparation of new dyestuffs of the anthraquinone series, and more particularly to the preparation of new cyanoanthraquinones, which carry in the 1-position an amino radical of the class consisting of amino, alkylamino and acidylamino groups, and which carry in the 4-position an arylamino group of the benzene series.

I have found that new and valuable dyestuffs of the acid wool series may be prepared from 1-aminoanthraquinone compounds which carry in the 1-position an amino radical of the class consisting of amino, alkylamino or acidylamino radicals, and which carry in the 5- or 8-position a cyano group, (see co-pending U. S. application Serial No. 224,122) by introducing into the molecule in the 4-position an aryl group of the benzene series. These 1-aminoanthraquinone compounds which carry in the 5 or 8 position a cyano group and in the 2 position a hydrogen, bromine or sulfonic acid radical and in the 4 position a bromine atom are prepared by direct sulfonation of the corresponding 1-amino-5 or 8 cyano compounds with subsequent bromination or by bormination of the 1-amino-5 or 8 cyanoanthraquinone compounds with subsequent replacement of the halogen in the 2 position by a sulfonic acid radical. These compounds on sulfonation or when they carry a sulfonic acid radical in the 2-position dye in much greener shades of blue than the compounds which do not contain the cyano radical, and exhibit improved light fastness. The sulfonic acid radical may be introduced by direct sulfonation of the arylaminoanthraquinone or it may be introduced into the anthraquinone nucleus during an intermediate step in the preparation of the compound or by replacing the halogen when present in the 2-position by the sulfonic acid group.

The following examples are given to illustrate the invention. The parts used are by weight.

Example 1

50 parts of 1-amino-2:4-dibromo-5-cyanoanthraquinone are mixed with 200 parts of p-toluidine, 50 parts of ammonium acetate, 1 part of copper acetate and 150 parts of water. The reaction mixture is heated to a reflux temperature of 105° C. for 16 hours, cooled to 70° C. and diluted with an equal volume of ethyl alcohol. The diluted condensation is then allowed to cool to room temperature over a period of 8 hours, filtered, washed with ethyl alcohol and hot water and dried. The bronzy blue base so obtained is 1 - amino - 2 - bromo-4-toluidino-5-cyanoanthraquinone. It is soluble in organic solvents with a greenish blue color. Other similar bases may be obtained in great variety through the use of other amines in place of p-toluidine.

When the 1 - amino-2-bromo-4-p-toluidino-5-cyanoanthraquinone is dissolved in sulfuric acid monohydrate and oleum added, there is obtained a soluble dyestuff of greenish blue shade which dyes wool and silk in strong shades of good leveling and excellent light fastness properties.

Example 2

25 parts of 1-amino-2-bromo-4-p-toluidino-5-cyanoanthraquinone are heated in an autoclave with 20 parts of potassium sulfite, 30 parts of water and 120 parts of phenol. The reaction mass is heated to 125 to 130° C. for 10 hours. The autoclave is cooled to room temperature and a small amount of sodium hydroxide added. The phenol is then removed by steam distillation and the blue color solution filtered free of insoluble matter. The colored mother liquor is then cooled and salted out with sodium chloride. The precipitated dyestuff is filtered off and dried. It consists of 1-amino-2-sulfo-4-toluidino-5-cyanoanthraquinone and dyes wool in greenish blue shades of good fastness properties.

Example 3

75 parts of 1 - amino - 2:4-dibromo-8-cyanoanthraquinone as obtained in Example 4 of co-pending U. S. application Serial No. 224,122 are added to 300 parts of p-toluidine, 75 parts of ammonium acetate, 225 parts of water and 1 part of copper acetate. The mixture is refluxed for 10 hours at 100 to 110° C., cooled to 70° C. and diluted with an equal volume of ethyl alcohol. The diluted mixture is then held at 60° C. for 2 hours, cooled to 35° C. and filtered. The insoluble bronzy base is then washed with alcohol and hot water and finally dried. It consists of 1-amino - 2-bromo-4-p-toluidino-8-cyanoanthroquinone. In place of p-toluidine there can be employed aniline, xylidine, diphenylamine, or any other similar amine. The bromine atom in beta position may be further replaced by the sulfonic acid radical as illustrated above.

Example 4

10 parts of 1-amino-2-bromo-4-p-toluidino-8-cyanoanthraquinone as obtained in Example 3 are added to 100 parts of sulfuric acid monohydrate. The mixture is stirred until solution is entirely completed. This usually takes about 1 hour. 25 parts of 60% oleum are then added in ½ hour keeping the temperature below 30° C. by external cooling. When sulfonation is complete as evidenced by complete solution of 1 drop of the sulfonation in 10 cc. of cold water, the sulfuric acid solution is poured into 600 parts of ice and water. It is filtered off, and the precipitated dyestuff is washed acid-free with 10% brine solution. The wet cake is then dried at 90 to 100° C.

The dyestuff so obtained dyes wool in greenish blue shades of good fastness to light and fulling.

*Example 5*

34 parts of 1-methylamino-4-bromo-5-cyanoanthraquinone as obtained in Example 5 of co-pending U. S. application Serial No. 224,122 are added to 136 parts of p-toluidine, 34 parts of ammonium acetate, 102 parts of water and 0.5 part of copper acetate. The mixture is refluxed at 100 to 110° C. for 4 hours and then cooled to 70° C. It is diluted with an equal volume of ethyl alcohol and held at 60° C. for 2 hours additional. The condensation product is then filtered off, washed with alcohol and hot water and finally dried at 100 to 110° C.

The bronzy base obtained is 1-methylamino-4-p-toluidino-5-cyanoanthraquinone. When sulfonated in the usual manner with sulfuric acid monohydrate and oleum, there is obtained a very greenish blue dyestuff which is much greener than that obtained by sulfonating 1-amino-4-p-toluidino-5-cyanoanthraquinone. It dyes wool in brilliant greenish blue shades of good fastness to light and fulling and has good leveling properties.

*Example 6*

If 1-methylamino-4-bromo-8-cyanoanthraquinone as obtained in Example 6 of co-pending U. S. application Serial No. 224,122 is condensed with p-toluidine by any of the usual condensation methods (as in Example 5) there is obtained 1-methylamino-4-p-toluidino-8-cyanoanthraquinone. The compound is easily sulfonated to give a greenish blue dyestuff of similar proporties to that obtained in Example 5.

In the above examples, other aryl amines of the benzene series, such as aniline, isomeric toluidines, xylidines and p-dodecyl-aniline, may be substituted for the toluidines specifically employed to give dyestuffs which have improved dyeing properties than those heretofore produced which do not carry the cyano group in the 5 or 8-position. Likewise there may be substituted for the 1-amino-, and 1-methylamino-4-bromo-5 (or 8)-cyanoanthraquinones the 1-acidylamino-substituted compounds, such as 1-benzoylamine-4-bromo-5 (or 8)-cyanoanthraquinones or the corresponding toloylamino, acetyl, or formyl compounds.

I claim:

1. Cyanoanthraquinone compounds which carry in the 1-position an amino radical of the class consisting of amino, alkylamino, and acidyl-amino radicals, in the 2-position a member of the group consisting of hydrogen, bromine and sulfonic acid groups, in the 4-position an arylamino radical of the benzene series, and a cyano radical in one of the positions 5 and 8.

2. Cyanoanthraquinonesulfonic acids which carry in the 1-position an amino radical of the class consisting of amino, alkylamino, and acidyl-amino radicals, in the 2-position a member of the group consisting of hydrogen, bromine and sulfonic acid groups, in the 4-position an arylamino radical of the benzene series, and a cyano radical in one of the positions 5 and 8.

3. 1-methylamino-4-arylaminoanthraquinonesulfonic acids which carry a cyano group in one of the alpha positions 5 and 8.

4. 1-methylamino-4-toluidino-5-cyanoanthraquinonesulfonic acid, in which the sulfonic acid radical is in the toluene group.

5. 1-amino-2-bromo-4-toluidino-5-cyanoanthraquinonesulfonic acid, in which the sulfonic acid radical is in the toluene group.

EDWIN C. BUXBAUM.